(12) United States Patent
Kosakai et al.

(10) Patent No.: US 9,025,929 B2
(45) Date of Patent: *May 5, 2015

(54) IMAGE CAPTURING APPARATUS AND IMAGE CAPTURING METHOD

(71) Applicant: Sony Corporation, Tokyo (JP)

(72) Inventors: Ryota Kosakai, Tokyo (JP); Katsutoshi Aiki, Kanagawa (JP); Nobuyuki Sato, Tokyo (JP); Hiroki Nagahama, Tokyo (JP); Masatoshi Sase, Kanagawa (JP); Yutaka Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,615

(22) Filed: Aug. 19, 2014

(65) Prior Publication Data

US 2014/0355948 A1 Dec. 4, 2014

Related U.S. Application Data

(63) Continuation of application No. 12/447,480, filed as application No. PCT/JP2007/070389 on Oct. 12, 2007, now Pat. No. 8,849,090.

(30) Foreign Application Priority Data

Oct. 30, 2006 (JP) ................. P2006-293836

(51) Int. Cl.
*H04N 5/932* (2006.01)
*H04N 5/783* (2006.01)
(Continued)

(52) U.S. Cl.
CPC ............... *H04N 5/783* (2013.01); *H04N 5/232* (2013.01); *H04N 5/23245* (2013.01);
(Continued)

(58) Field of Classification Search
None
See application file for complete search history.

(56) References Cited

U.S. PATENT DOCUMENTS 4,496,995 A 1/1985 Colles et al.
5,196,938 A * 3/1993 Blessinger ............... 348/22
(Continued)

FOREIGN PATENT DOCUMENTS

EP 1 499 116 1/2005
EP 1721457 11/2006
(Continued)

*Primary Examiner* — William C Vaughn, Jr.
*Assistant Examiner* — Eileen Adams
(74) *Attorney, Agent, or Firm* — Frommer Lawrence & Haug LLP; William S. Frommer; Ellen Marcie Emas

(57) ABSTRACT

In a high speed image capturing state, a camera signal processing circuit is not needed to perform a signal process at a high screen rate, but at a regular screen rate. In the high speed image capturing mode, raw data of 240 fps received from an image sensor 101 are recorded on a recording device 111 through a conversion processing section 201 and a recording device controlling circuit 210. Raw data that have been decimated and size-converted are supplied to a camera signal processing circuit 203 through a pre-processing circuit 202 and an image being captured is displayed on a display section 112 with a signal for which a camera process has been performed. In a reproducing state, raw data are read from the recording device 111 at a low screen rate according to a display performance of the display section 112 and the raw data that have been read are processed are processed by the pre-processing circuit 202 and the camera signal processing circuit 203 and a reproduced image is displayed by the display section 112.

30 Claims, 15 Drawing Sheets

(51) Int. Cl.
*H04N 5/232* (2006.01)
*G11B 31/00* (2006.01)
*H04N 5/77* (2006.01)
*H04N 9/73* (2006.01)
*H04N 7/01* (2006.01)

(52) U.S. Cl.
CPC ........... *H04N 7/0105* (2013.01); *H04N 7/0127* (2013.01); *G11B 31/006* (2013.01); *H04N 5/77* (2013.01); *H04N 9/735* (2013.01)

(56) References Cited

U.S. PATENT DOCUMENTS

| | | | |
|---|---|---|---|
| 5,557,424 A * | 9/1996 | Panizza | 386/228 |
| 5,568,192 A | 10/1996 | Hannah | |
| 5,625,412 A | 4/1997 | Aciu et al. | |
| 5,751,350 A | 5/1998 | Tanaka | |
| 5,786,851 A | 7/1998 | Kondo et al. | |
| 5,856,845 A | 1/1999 | Murata et al. | |
| 6,453,117 B1 | 9/2002 | Ito et al. | |
| 7,058,280 B2 | 6/2006 | Suzuki | |
| 7,310,118 B2 | 12/2007 | Kamimura | |
| 7,557,833 B2 | 7/2009 | Okawa | |
| 7,593,037 B2 * | 9/2009 | Matsumoto et al. | 348/208.13 |
| RE43,462 E | 6/2012 | Washino et al. | |
| 8,849,090 B2 * | 9/2014 | Kosakai et al. | 386/219 |
| 2003/0210338 A1 | 11/2003 | Matsuoka et al. | |
| 2004/0136689 A1 | 7/2004 | Oka | |
| 2004/0151471 A1 | 8/2004 | Ogikubo | |
| 2004/0151479 A1 | 8/2004 | Ogikubo | |
| 2005/0036055 A1 | 2/2005 | Nakasuji et al. | |
| 2005/0068424 A1 | 3/2005 | Kaneko et al. | |
| 2005/0104978 A1 | 5/2005 | Shinotsuka | |
| 2005/0158025 A1 * | 7/2005 | Shinkai | 386/68 |
| 2005/0163492 A1 | 7/2005 | Ueda et al. | |
| 2005/0243180 A1 | 11/2005 | Yokonuma | |
| 2006/0013507 A1 | 1/2006 | Kaneko et al. | |
| 2006/0061666 A1 | 3/2006 | Kaneko et al. | |
| 2006/0147187 A1 | 7/2006 | Takemoto et al. | |
| 2006/0232688 A1 | 10/2006 | Suzuki et al. | |
| 2009/0189994 A1 | 7/2009 | Shimonaka | |

FOREIGN PATENT DOCUMENTS

| | | |
|---|---|---|
| GB | 2 240 446 | 7/1991 |
| JP | A HEI 07-095507 | 4/1995 |
| JP | A HEI 07-298112 | 11/1995 |
| JP | 8 88833 | 4/1996 |
| JP | 8 251492 | 9/1996 |
| JP | A HEI 09-224221 | 8/1997 |
| JP | A 2000-050205 | 2/2000 |
| JP | A 2001-045427 | 2/2001 |
| JP | A 2001-103356 | 4/2001 |
| JP | A 2001-112012 | 4/2001 |
| JP | A 2001-036848 | 9/2001 |
| JP | A 2002-320203 | 10/2002 |
| JP | A 2004-120384 | 4/2004 |
| JP | A 2004-221955 | 8/2004 |
| JP | A 2004-242267 | 8/2004 |
| JP | A 2005-006198 | 1/2005 |
| JP | 2005 39708 | 2/2005 |
| JP | A 2005-039709 | 2/2005 |
| JP | 2005 295423 | 10/2005 |
| JP | A 2005-295423 | 10/2005 |
| JP | 2006 94145 | 4/2006 |
| JP | A 2006-121479 | 5/2006 |
| JP | A 2006-157149 | 6/2006 |
| JP | A 2006-157152 | 6/2006 |
| JP | A 2006-180315 | 7/2006 |
| JP | A 2006-295851 | 10/2006 |
| JP | 2007 511992 | 5/2007 |
| WO | WO97 30548 | 8/1997 |
| WO | WO 02/21828 | 3/2002 |
| WO | WO 2006 067909 | 6/2006 |

* cited by examiner

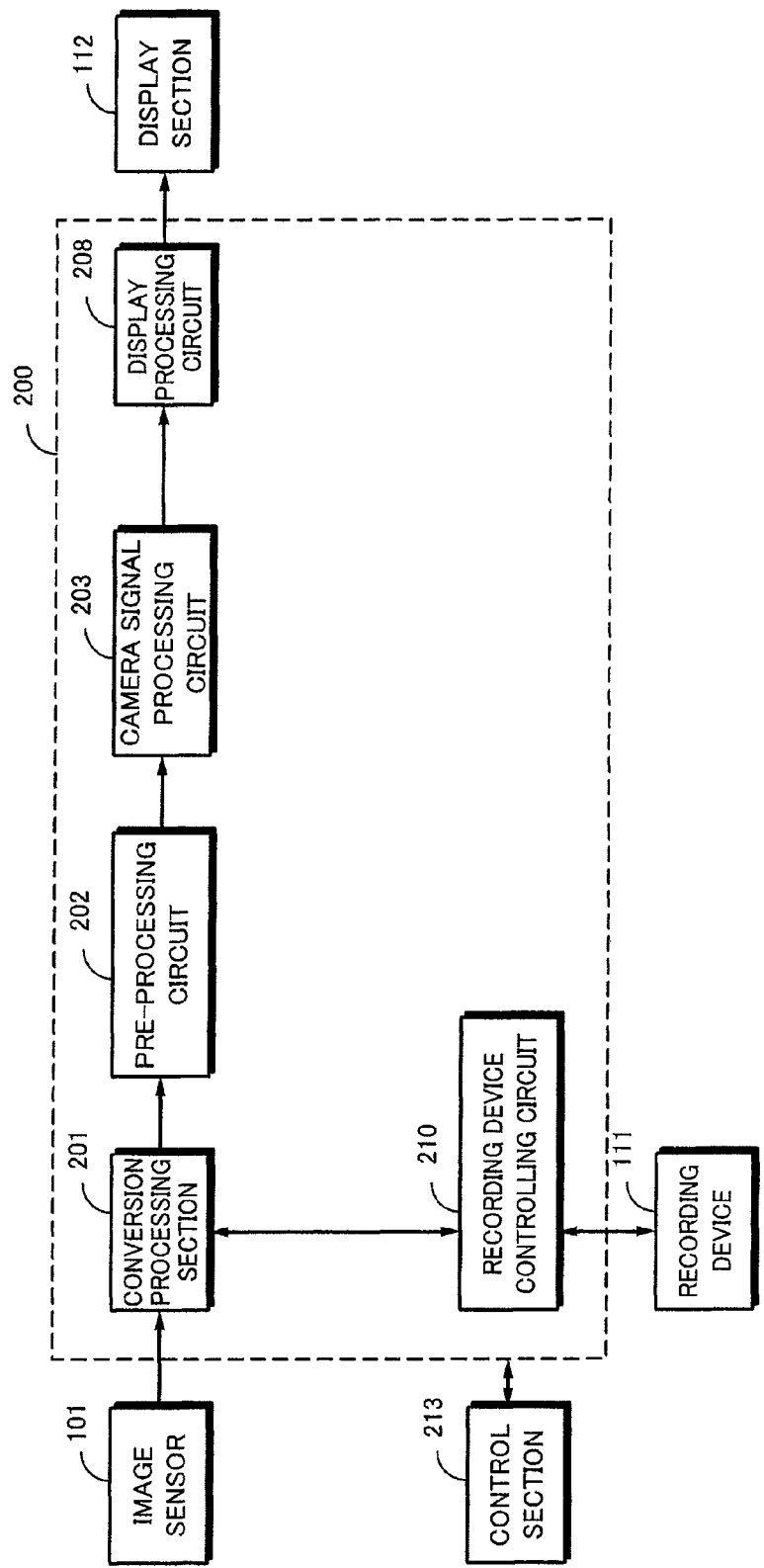

IMAGE CAPTURING APPARATUS AND IMAGE CAPTURING METHOD

This is a continuation of application Ser. No. 12/447,480, filed Apr. 28, 2009, which is a 371 of PCT application serial number PCT/JP2007/070389, filed Oct. 12, 2007, which is entitled to the priority filing date of Japanese application number P2006-293836, filed Oct. 30, 2006, the entirety of which is incorporated herein by reference.

TECHNICAL FIELD

The present invention relates to an image capturing apparatus and an image capturing method, in particular, to those that capture images using a high speed image sensor.

BACKGROUND ART

In the past, high speed video cameras that can capture images at high speeds have been known. For example, a video camera has accomplished high speed image capturing by converting an image size per one image to be processed at a high speed rate into ¼ of the standard image size and placing these four images in an image of the regular rate (see Patent Document "Japanese Patent Application Laid-Open Publication No. HEI 8-88833"). Another video camera has accomplished high speed image capturing using a circuit structure that processes data received from a sensor in parallel so as to increase a process amount per unit time (see Patent Document "Japanese Patent Application Laid-Open Publication No. HEI 8-251492").

However, the high speed image capturing described in Patent Document "Japanese Patent Application Laid-Open Publication No. HEI 8-88833" or Patent Document "Japanese Patent Application Laid-Open Publication No. HEI 8-251492" was aimed to temporarily store a captured image in a storage device such as a VTR or a semiconductor memory, reproduce the captured image in slow motion, and analyze a very high speed motion and the device itself had a complicated structure and was expensive. Thus, it was difficult to apply high speed image capturing systems as described in Patent Document 1 or Patent Document 2 to portable image capturing devices that have been widespread as home-use devices, so-called camcorders (product names of devices in which a video camera and a recorder are integrated in one unit), digital cameras, and so forth from view points of portability and power consumption.

With reference to FIG. 1, an image capturing apparatus designed taking account of such points will be described. The structure shown in FIG. 1 has the same structure as that of an existing camcorder. In other words, an image capturing apparatus 100 shown in FIG. 1 includes an image sensor 101, a pre-processing circuit 102, a camera signal processing circuit 103, a conversion processing section 104, a compression and decompression circuit 105, a memory control circuit 106, a memory 107, a display processing circuit 108, a compression and decompression circuit 109, a recording device control circuit 110, a recording device 111, a display section 112, and a control section 113.

The image sensor 101 can select a high speed image capturing mode in which the image sensor 101 reads a signal at a first screen rate (also referred to as frame rate) of 60 fps (fields/second) or more based on the NTSC specifications or a regular image capturing mode in which the image sensor 101 reads a signal at a regular second screen rate. The screen rate in the high speed image capturing mode is 240 fps that, is four times higher than that of the regular rate. The image sensor 101 is equipped with a CDS (Correlated Double Sampling) and an A/D converter and the image sensor 101 outputs captured image data.

The pre-processing circuit 102 performs an optically correcting process such as a shading correction for captured image data that are output from the image sensor 101 and outputs a digital image signal. The camera signal processing circuit 103 performs a camera signal process such as a white balance adjustment process for the captured image data that are received from the pre-processing circuit 102.

The conversion processing section 104 performs a display decimation and a size adjustment to convert an image signal received from the camera signal processing circuit 103 into an image signal having a screen rate and a screen size suitable for a display of the display section 112. The display decimation is performed only when an image signal received from the camera signal processing circuit 103 is output to the display processing circuit 108. The display decimation decimates the number of fields per unit time of the image signal captured by the image capturing apparatus 100 in the high speed image capturing mode to the number of fields per unit time defined in the display standard of the display device (60 fps in this case).

The compression and decompression circuit 105 performs a compression-encoding process for captured image data received from the conversion processing section 104 according to a still image encoding system, for example, JPEG (Joint Photographic Experts Group) or the like. In addition, the compression and decompression circuit 105 performs a decompression-decoding process for encoded data of a still image supplied from the memory control circuit 106. The memory control circuit 106 controls writing and reading image data to and from the memory 107. The memory 107 is a FIFO (First In First Out) type buffer memory that temporarily stores image data received from the memory control circuit 106 and, for example, an SDRAM (Synchronous Dynamic Random Access Memory) or the like is used for the memory 107.

The display processing circuit 108 generates an image signal to be displayed on the display section 112 from an image signal received from the conversion processing section 104 or the compression and decompression circuit 109, supplies the signal to the display section 112, and causes it to display an image. The display section 112 is composed, for example, of an LCD (Liquid Crystal Display) and displays a camera-through image that is being captured or a reproduced image of data that have been recorded in the recording device 111.

The compression and decompression circuit 109 performs a compression-encoding process according to a moving image encoding system, for example, MPEG (Moving Picture Experts Group) or the like for image data received from the conversion processing section 104. In addition, the compression and decompression circuit 109 performs a decompression-decoding process for encoded data of a moving image supplied from the recording device 111 and outputs the resultant data to the display processing circuit 108. The display section 112 displays a moving image received from the display processing circuit 108.

The control section 113 is a microcomputer composed, for example, of a CPU (Central Processing Unit), a ROM (Read Only Memory), a RAM (Random Access Memory), and so forth and totally controls each section of the image capturing apparatus by executing programs stored in the ROM and so forth.

In the image capturing apparatus shown in FIG. 1, in the high speed image capturing mode, a captured image signal of 240 fps received from the image sensor 101 is supplied to the camera signal processing circuit 103 through the pre-processing circuit 102. The conversion processing section 104 decimates an output image signal of the camera signal processing circuit 103 by ¼ so that an output signal of 60 fps is obtained. The decimated and size-converted image signal is supplied to the display processing circuit 108. The display processing circuit 108 generates an image signal to be displayed on the display section 112, supplies the resultant image signal to the display section 112, and causes it to display an image.

When receiving a record request of a high speed captured image from the control section 113 according to the user's operation, the conversion processing section 104 sends an image signal of 240 fps to the compression and decompression circuit 105. If necessary, the conversion processing section 104 reduces the size of the image signal received from the camera signal processing circuit 103 and sends the image signal to the compression and decompression circuit 105.

The compression and decompression circuit 105 compression-encodes the image signal received from the conversion processing section 104 according to the JPEG format. The memory control circuit 106 temporarily stores encoded data received from the compression and decompression circuit 105 into the memory 107. In such a manner, image data for a predetermined period are stored in the memory 107.

When receiving a read request for encoded data stored in the memory 107 from the control section 113, the memory control circuit 106 reads the encoded data stored in the memory 107 at 60 fps and sends the encoded data to the compression and decompression circuit 105. The compression and decompression circuit 105 decompression-decodes the encoded data received from the memory control circuit 106 and sends the decoded data to the conversion processing section 104. When receiving a record request for the recording device 111 from the control section 113, the conversion processing section 104 sends the image signal received from the compression and decompression circuit 105 to the compression and decompression circuit 109. The compression and decompression circuit 109 compresses the image signal received from the conversion processing section 104 according to the MPEG format and stores the compression-encoded signal to the recording device 111 through the recording device control circuit 110. The conversion processing section 104 adjusts the size of the image signal of 60 fps received from the compression and decompression circuit 105, sends the resultant image signal to the display processing circuit 108, and causes display section 112 to display a reproduced image.

In the foregoing proposed image capturing apparatus shown in FIG. 1, in the high speed image capturing mode of the image sensor 101, since the screen rate of the output captured signal is high, the pre-processing circuit 102 and the camera signal processing circuit 103 are required to operate at a high speed. If the system is accomplished by an LSI or the like, since the calculation scales of the pre-processing circuit 102 and the camera signal processing circuit 103 are large in the whole system, a high speed process or a parallel process is not advantageous from the view point of circuit area and power consumption. Moreover, in the structure shown in FIG. 1, since a captured image signal was temporarily stored in the memory 107, there was a problem that after the high speed image capturing mode was stopped, it took a process time to decode data temporarily stored in the memory 107 and to re-encode the data according to the regular record format.

DISCLOSURE OF THE INVENTION

Therefore, an object of the present invention is to provide an image capturing apparatus and an image capturing method that do not need to cause a camera signal processing circuit to perform a process at a high speed screen rate and that are easy to operate, are produced at low cost, and thereby have excellent portability.

To solve the foregoing problems, the present invention is an image capturing apparatus, comprising:
record medium control means for recording captured image data having a first screen rate obtained from a solid state image capturing device to a record medium and reading captured image data having a second screen rate which is lower than the first screen rate from the record medium;
conversion means for converting the captured image data having the first screen rate obtained from the solid state image capturing device into the captured image data having the second screen rate;
camera signal processing means for performing a camera signal process for the captured image data having the second screen rate obtained from the conversion means or the record medium control means; and
display processing means for generating an image signal to be displayed from an image signal obtained from the camera signal processing means.

The present invention is an image capturing apparatus, comprising:
record medium control means for recording captured image data having a first screen rate obtained from a solid state image capturing device to a record medium and reading captured image data having a second screen rate which is lower than the first screen rate from the record medium;
conversion means for converting the captured image data having the first screen rate obtained from the solid state image capturing device into the captured image data having the second screen rate;
first camera signal processing means for performing a camera signal process for the captured image data having the second screen rate obtained from the conversion means;
second camera signal processing means for performing a camera signal process for the captured image data having the second screen rate obtained from the record medium control means; and
display processing means for generating an image signal to be displayed from an image signal obtained from either the first and second camera signal processing means,
wherein the first camera signal processing means is simply structured in comparison with the second camera signal processing means.

The present invention is an image capturing apparatus, comprising:
first record medium control means for recording captured image data having a first screen rate obtained from a solid state image capturing device to a first record medium and reading captured image data having a second screen rate which is lower than the first screen rate from the record medium;
conversion means for converting the captured image data having the first screen rate obtained from the solid state image capturing device into the captured image data having the second screen rate;
first camera signal processing means for performing a camera signal process for the captured image data having the second screen rate obtained from the conversion means;
second camera signal processing means for performing a camera signal process for the captured image data having the second screen rate obtained from the first record medium control means;

second record medium control means for recording an output image signal of the second camera signal processing means to a second record medium and reading an image signal from the record medium at the second screen rate; and display processing means for generating an image signal to be displayed from either an output image signal obtained from the first camera signal processing means or an output image signal of the second record medium control means, wherein the first camera signal processing means is simply structured in comparison with the second camera signal processing means.

The present invention is an image capturing method, comprising:

a record medium control step for recording captured image data having a first screen rate obtained from a solid state image capturing device to a record medium and reading captured image data having a second screen rate which is lower than the first screen rate from the record medium;

a conversion step for converting the captured image data having the first screen rate obtained from the solid state image capturing device into the captured image data having the second screen rate;

a camera signal processing step for performing a camera signal process for the captured image data having the second screen rate obtained from the conversion step or the record medium control step; and a display processing step for generating an image signal to be displayed from an image signal obtained from the camera signal processing step.

The present invention is an image capturing method, comprising:

a record medium control step for recording captured image data having a first screen rate obtained from a solid state image capturing device to a record medium and reading captured image data having a second screen rate which is lower than the first screen rate from the record medium;

a conversion step for converting the captured image data having the first screen rate obtained from the solid state image capturing device into the captured image data having the second screen rate;

a first camera signal processing step for performing a camera signal process for the captured image data having the second screen rate obtained from the conversion step;

a second camera signal processing step for performing a camera signal process for the captured image data having the second screen rate obtained from the record medium control step; and a display processing step for generating an image signal to be displayed from an image signal obtained from either the first and second camera signal processing step, wherein the first camera signal processing step is simply structured in comparison with the second camera signal processing step.

The present invention is an image capturing method, comprising:

a first record medium control step for recording captured image data having a first screen rate obtained from a solid state image capturing device to a first record medium and reading captured image data having a second screen rate which is lower than the first screen rate from the record medium;

a conversion step for converting the captured image data having the first screen rate obtained from the solid state image capturing device into the captured image data having the second screen rate;

a first camera signal processing step for performing a camera signal process for the captured image data having the second screen rate obtained from the conversion step;

a second camera signal processing step for performing a camera signal process for the captured image data having the second screen rate obtained from the first record medium control step;

a second record medium control step for recording an output image signal of the second camera signal processing step to a second record medium and reading an image signal from the record medium at the second screen rate; and display processing step for generating an image signal to be displayed from either an output image signal obtained from the first camera signal processing step or an output image signal of the second record medium control step, wherein the first camera signal processing step is simply structured in comparison with the second camera signal processing step.

In the image capturing apparatus according to the present invention, although a screen rate of an image capturing device is high, a camera signal processing circuit is needed to always satisfy only a screen rate according to the display performance of a display section. Thus, it is not necessary to perform a high frequency drive and a parallel process only for high speed image capturing and thereby power consumption and circuit scale can be reduced.

BRIEF DESCRIPTION OF DRAWINGS

FIG. 2 is a block diagram showing an image capturing apparatus according to a first embodiment of the present invention;

BEST MODE FOR CARRYING OUT THE INVENTION

Next, with reference to accompanying drawings, a first embodiment of the present invention will be described. As shown in FIG. 2, a captured image signal received from an image sensor 101 is supplied to an image capturing apparatus 200 according to the first embodiment of the present invention.

The image sensor 101 converts incident light of an object captured through an optical system (including a lens, an infrared suppression filter, an optical low-pass filter, and so forth) into an electric signal according to the photoelectric conversion. As the image sensor 101, for example, a CMOS (Complementary Metal Oxide Semiconductor) type image capturing device is used. In the CMOS type image capturing device, photo diodes, line-column selection MOS transistors, signal wires, and so forth are two-dimensionally arranged to form a vertical scanning circuit, a horizontal scanning circuit, a noise reduction circuit, a timing generation circuit, and so forth. As the image sensor 101, a CCD (Charge Coupled Device) that can capture images at high speeds may be used.

The image sensor 101 can be switched over between a high speed image capturing mode in which a signal is read at a first screen rate (also referred to as the frame rate) higher than the regular screen rate (60 fps (fields/sec) that is based on the specifications of the NTSC system and a regular image capturing mode in which a signal is read at a second screen rate that is the regular screen rate. The screen rate of the high speed image capturing mode is needed to be 240 fps that is four times higher than that of the regular rate. The image sensor 101 is internally equipped with a CDS (Correlated Double Sampling), an A/D converter, and so forth and outputs a digitally captured image signal corresponding to the matrix of pixels of the image sensor 101.

The image sensor 101 uses three image capturing devices that output captured image signals, for example, of three-primary colors and obtains one output line every four output lines of each image capturing device to accomplish a screen rate of 240 fps that is four times higher than that of the regular screen rate (60 fps). Assuming that the number of pixels of one frame at the regular screen rate is, for example, 6.4 million pixels, the number of pixels in the high speed image capturing mode is 1.6 million pixels.

Figure 1:
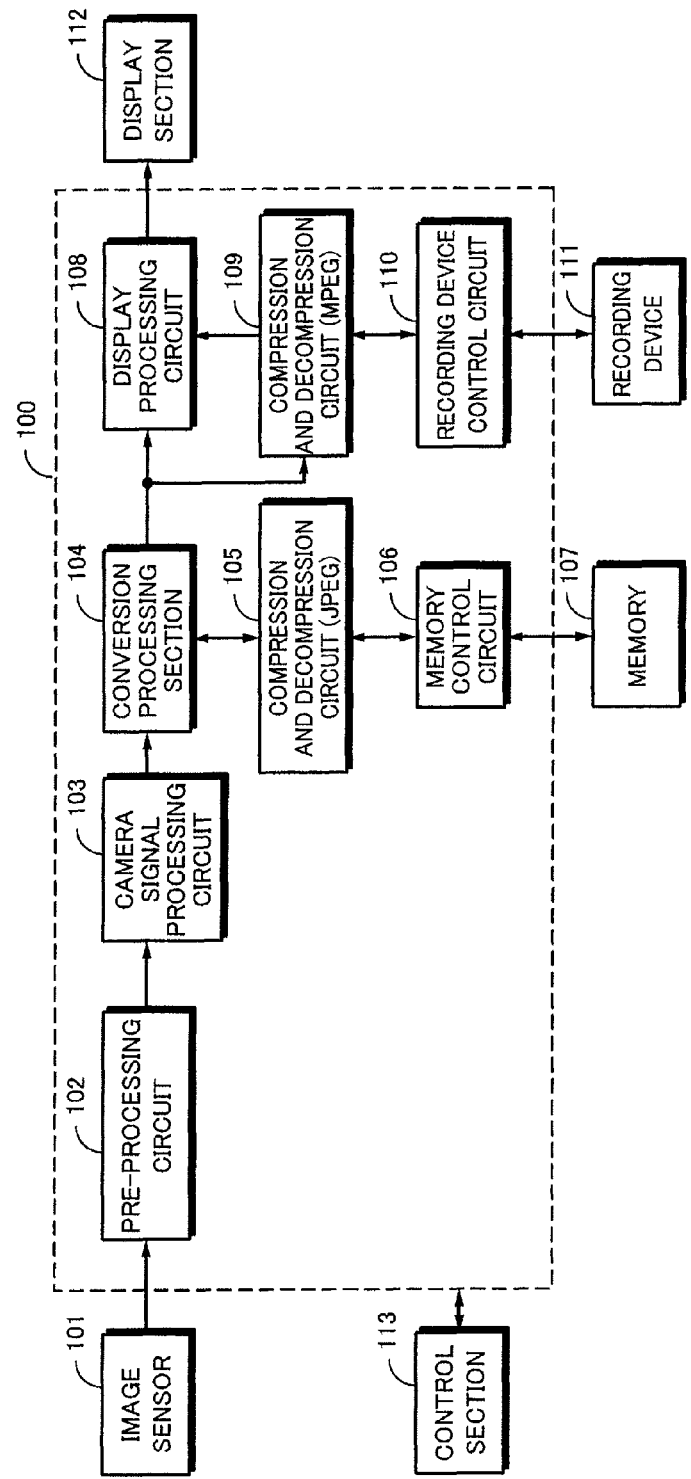
FIG. 1 is a block diagram showing an example of an image capturing apparatus that has been proposed.
Figure 3A:
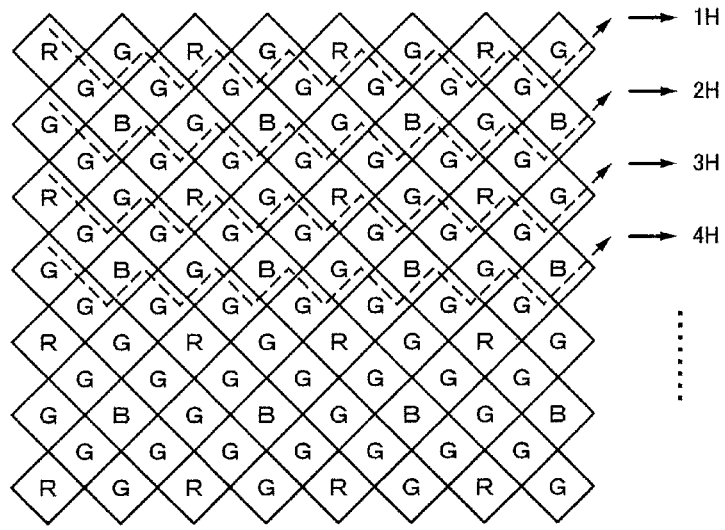
FIG. 3A and FIG. 3B are schematic diagrams used to describe an example of an image sensor according to the present invention.

FIG. 3A shows an example of an array of color filters according to the present invention. A square lattice array is inclined by 45° and each of R and B filters is surrounded by a G filter. In this structure, while necessary and sufficient spatial frequency characteristics are obtained for R and B components on the human's visual sensitivity, a spatial frequency characteristic of G component that is higher than that of each of R and B components in the human's sensitivities can be improved in comparison with that of the conventional Bayer's array. The G component becomes a main component to generate a luminance signal. Thus, not only the resolution of luminance of an achromatic object, but that of a chromatic object is improved and thereby the image quality is improved.

The color filter array shown in FIG. 3A is based on a method of alternately reading pixels of two adjacent lines in one horizontal period at the regular screen rate as denoted by broken lines. In other words, in the regular image capturing mode, pixels are scanned and read in such a sequence.

Figure 3B:
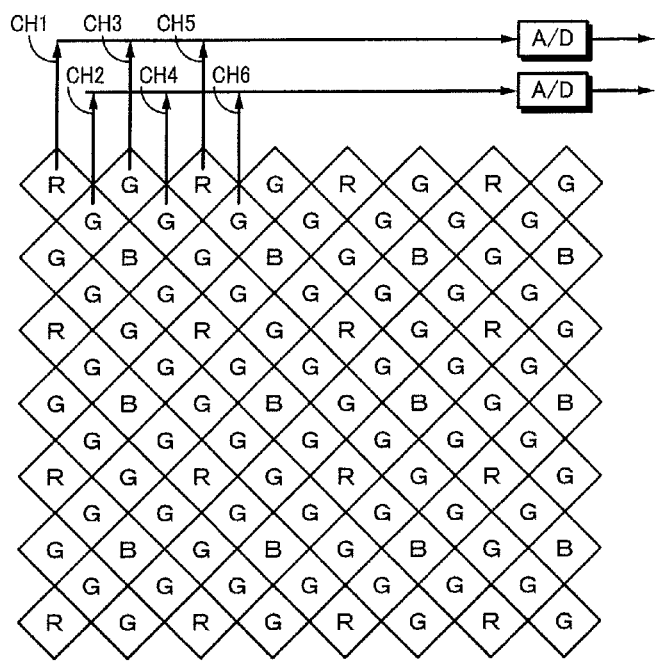

On the other hand, at the high screen rate, horizontal scanning lines are decimated and read at a rate of one every four horizontal scanning lines. To deal with the high screen rate, as shown in FIG. 3B, assuming that read outputs of six adjacent column pixels are denoted by CH1 to CH6, respectively, two A/D converters are disposed in common with three alternative columns (CH1, CH3, and CH5 and CH2, CH4, and CH6). The A/D converters convert, for example, one sample into digital data of 14 bits. Instead, respective A/D converters may be disposed at column pixels. CDSs (not shown) are disposed in the same manner as the A/D converters such that high speed, reading can be performed. As the image sensor 101, another structure in which three-primary color filters are arranged for one image capturing device may be used. Instead, image capturing devices using complementary color filters may be used.

The image capturing apparatus 200 includes a conversion processing section 201, a pre-processing circuit 202, a camera signal processing circuit 203, a display processing circuit 208, a recording device control circuit 210, a recording device 111, a display section, and a control section 213.

The conversion processing section 201 performs signal shunting and display decimating for a digital image signal received from the image sensor 101. The display decimating is performed only when a signal is output to the display processing circuit 208. The display decimating is a decimation of fields that satisfy the number of fields per unit time defined in the display standard in the high speed image capturing mode of the image capturing apparatus 200 (in this case, 60 fps).

The pre-processing circuit 202 performs an optically correcting process such as a shading correction for a digital image signal that is output from the image sensor 101 and outputs a resultant digital image signal. The camera signal processing circuit 203 performs a camera signal process such as a white balance adjustment process (also referred to as a development process, an image creation process, or the like) for the image signal received from the pre-processing circuit 202. An output signal of the camera signal processing circuit 203 is supplied to the display processing circuit 208.

The display processing circuit 208 generates an image signal to be displayed on the display section 112 from the image signal received from the camera signal processing circuit 203 and supplies the resultant signal to the display section 112 to cause it to display an image. The display section 112 is composed, for example, of an LCD (Liquid Crystal Display) and displays a camera-through image that is being captured, a reproduced image of data recorded on the recording device 111, and so forth. The display section 112 may be disposed outside the image capturing apparatus 200 and it may be provided with an interface for an external output instead of the display section 112.

The recording device control circuit 210 connected to the conversion processing section 201 controls writing and reading image data to and from the recording device 111. Data stored in the recording device 111 are captured image data that have not been processed by the foregoing pre-processing circuit 202 and camera signal processing circuit 203 and are referred to as raw data in this specification.

As the recording device 111, a magnetic tape, a semiconductor memory such as a flash memory, a hard disk, or the like can be used. As the recording device 111, a non-attachable/detachable type is basically used. However, the recording device 111 may be attachable/detachable such that raw data can be retrieved to the outside. When raw data are retrieved to the outside, raw data that have been processed in the pre-processing circuit 202 are preferably retrieved. The camera signal process is performed, for example, according to software of an external personal computer.

The control section 213 is a microcomputer composed, for example, of a CPU (Central Processing Unit), a ROM (Read Only Memory), a RAM (Random Access Memory), and so forth and totally controls each section of the image capturing apparatus by executing programs stored in the ROM and so forth.

Figure 4:
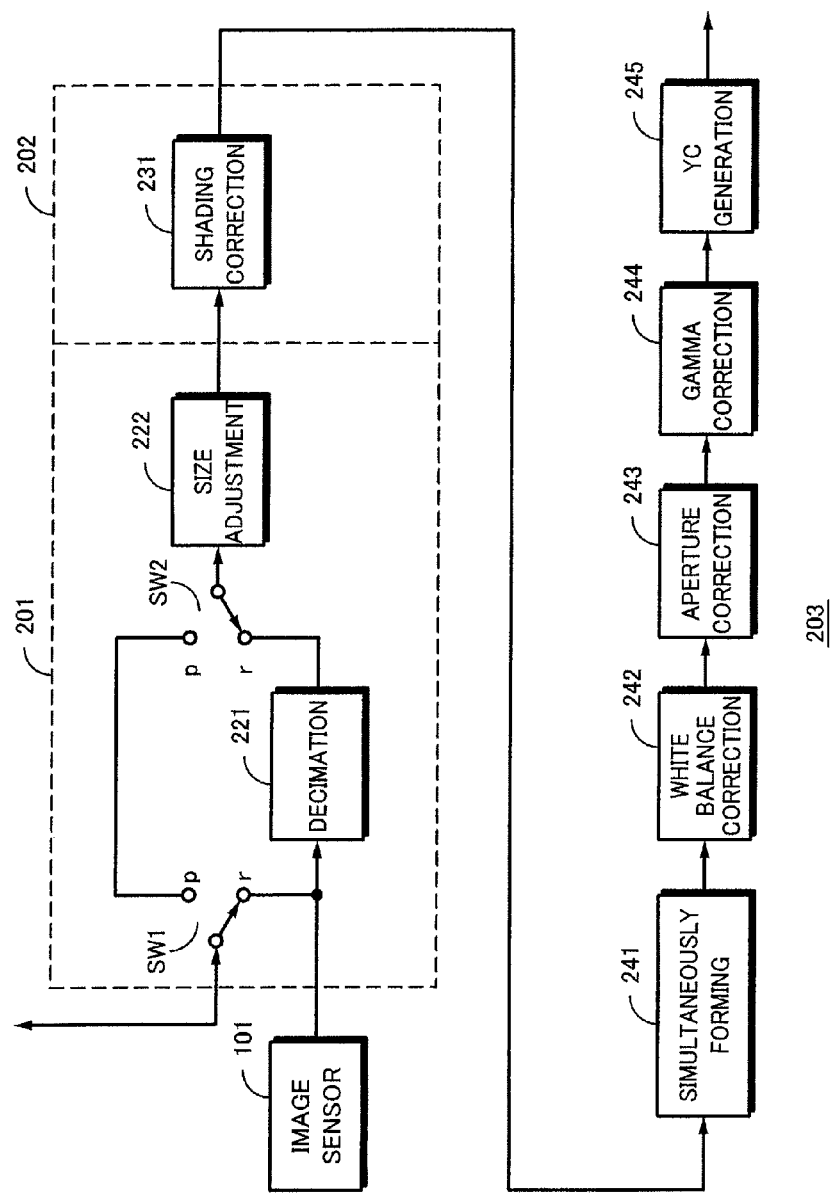
FIG. 4 is a block diagram showing a more detailed structure of a part of the first embodiment of the present invention.

FIG. 4 shows an example of a structure of the conversion processing section 201, the pre-processing circuit 202, and the camera signal processing circuit 203. Captured image data received from the image sensor 101 (including CDSs and A/D converters) are supplied to the conversion processing section 201. The conversion processing section 201 is composed of switches SW1 and SW2, a decimation section 221, and a size adjustment section 222. The decimation section 221 performs a display decimation. The size adjustment section 222 changes the size of an image to be displayed to an appropriate size. Either the decimation section 221 or both of the decimation section 221 and the size adjustment section 222 decrease the screen rate of raw data in the high speed image capturing state to the regular rate. The switches SW1 and SW2 are changed over in the recording state and the reproducing state and a terminal selected in the recording state is denoted by r and a terminal selected in the reproducing state is denoted by p.

An output image signal of the size adjustment section 222 of the conversion processing section 201 is supplied to a shading correction circuit 231 of the pre-processing circuit 202. The shading correction circuit 231 corrects the brightness of the vicinity of the screen such that it does not become dark. An output signal of the shading correction circuit 231 is supplied to the camera signal processing circuit 203.

The camera signal processing circuit 203 is composed, for example, of a simultaneously forming circuit 241, a white balance correction section 242, an aperture correction section 243, a gamma correction section 244, and a YC generation section 245 arranged in the order from the input side. However, the structure of the camera signal processing circuit 203 is not limited to that shown in FIG. 4. For example, the arrangement order of these structural elements may be changed or a part of which may be omitted.

The simultaneously forming circuit 241 interpolates lost pixels of each color component. The simultaneously forming circuit 241 outputs three-primary color signals (R, G, B) in parallel. Output signals of the simultaneously forming circuit 241 are supplied to the white balance correction section 242. The white balance correction section 242 corrects unbalancing of colors caused by a different color temperature environment of an object and different sensitivities of color filters of the sensor.

An output of the white balance correction section 242 is supplied to the aperture correction section 243. The aperture correction section 243 is to perform a contour correction that extracts a portion where a signal largely changes and emphasizes the portion. An output signal of the aperture correction section 243 is supplied to the gamma correction section 244.

The gamma correction section 244 corrects input and output characteristics such that the gradation is correctly reproduced when a captured image signal is output to the display section 112. An output signal of the gamma correction section 244 is supplied to the YC generation section 245.

The YC generation section 245 generates a luminance signal (Y) and a color difference signal (C). The luminance signal is generated by combining the gamma-corrected RGB signals at a predetermined composition ratio. The color difference signal is generated by combining the gamma-corrected RGB signals at a predetermined composition ratio. The generated luminance signal and color difference signal are supplied to the display section 112 through the display processing circuit 208.

Figure 5:
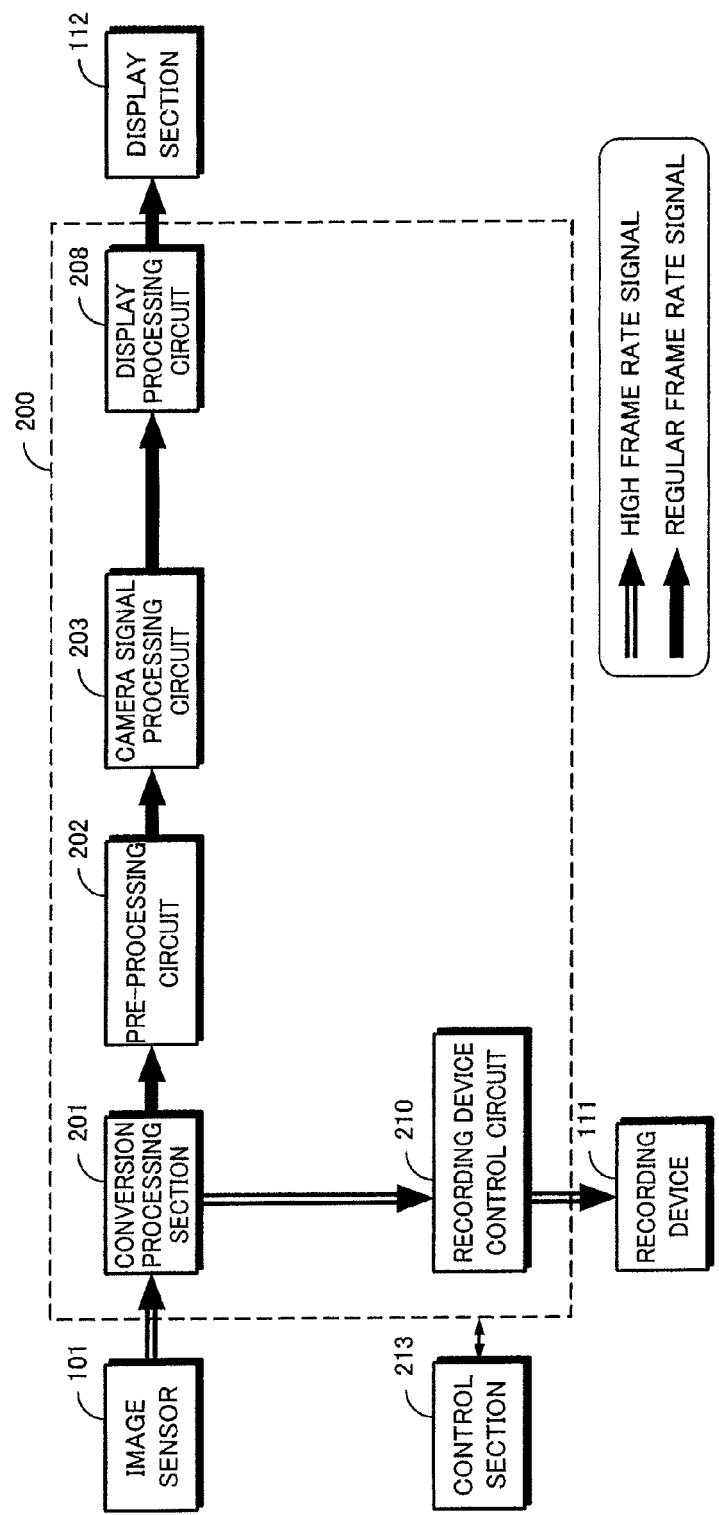
FIG. 5 is a data flow chart in a high speed image capturing mode according to the first embodiment of the present invention.

In the image capturing apparatus shown in FIG. 2, in the high speed image capturing mode, as shown in FIG. 4, the control section 213 controls the switches SW1 and SW2 of the conversion processing section 201 to select the terminal r side. FIG. 5 shows signal flows in the high speed image capturing mode. As shown in FIG. 5, raw data of 240 fps received from the image sensor 101 are supplied to the recording device 111 through the terminal r of the switch SW1 and the recording device control circuit 210. When a record request for an image that has been captured at a high speed is received from the control section 213 according to the user's operation, raw data are recorded on the recording device 111.

The decimation section 221 of the conversion processing section 201 decimates raw data by ¼ such that the raw data of 60 fps are obtained. The raw data that have been decimated and size-converted are supplied to the camera signal processing circuit 203 through the pre-processing circuit 202. A signal for which the camera signal process has been performed in the camera signal processing circuit 203 is supplied to the display section 112 through the display processing circuit 208 and an image that is being captured is displayed on the display section 112.

Figure 6:
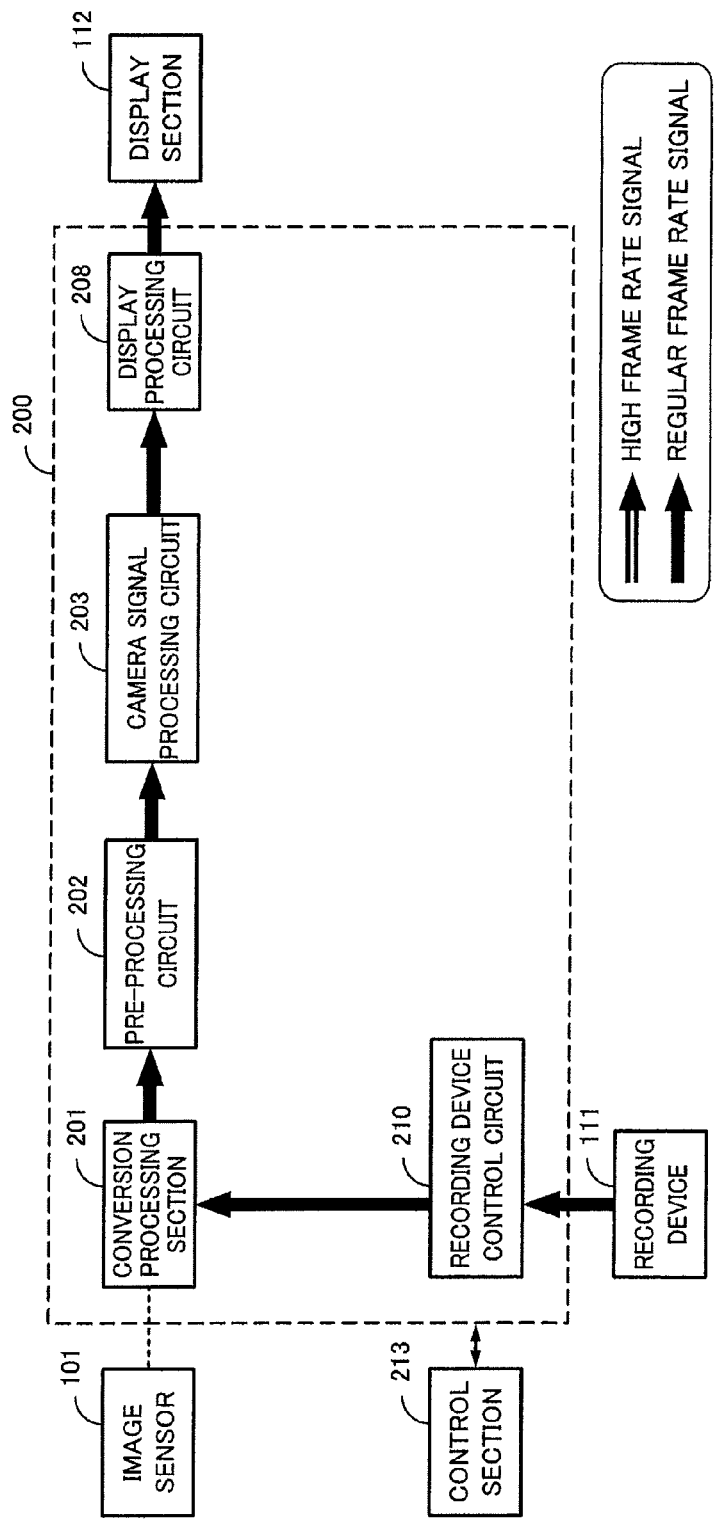
FIG. 6 is a data flow chart in an image reproducing state of the first embodiment of the present invention.

In the image capturing apparatus shown in FIG. 2, in the reproducing state, the control section 213 controls the switches SW1 and SW2 of the conversion processing section 201 to select the terminal p side. FIG. 6 shows signal flows in the reproducing state. As shown in FIG. 6, raw data of the low screen rate (for example, 60 fps) are read from the recording device 111 according to the display performance of the display section 112 under the control of the recording device control circuit 210. The raw data that have been read are supplied from the recording device control circuit 210 to the pre-processing circuit 202 through the switches SW1 and SW2 of the conversion processing section 201 and the size adjustment section 222.

An output signal of the pre-processing circuit 202 is supplied to the display section 112 through the camera signal processing circuit 203 and the display processing circuit 208 and a reproduced image is displayed by the display section 112. For example, when only the screen rate has been changed, the reproduced image becomes a slow motion reproduced image, the time axis of which has been expanded four times than in the recording state. Instead, images may be captured by changing image capturing conditions (exposure condition and so forth) and when they are reproduced, the four types of captured images (any of still images or moving images) may be compared. Instead, a signal that is read from the recording device 111 may be decimated so as to obtain a frame-by-frame reproduction image.

Figure 7:
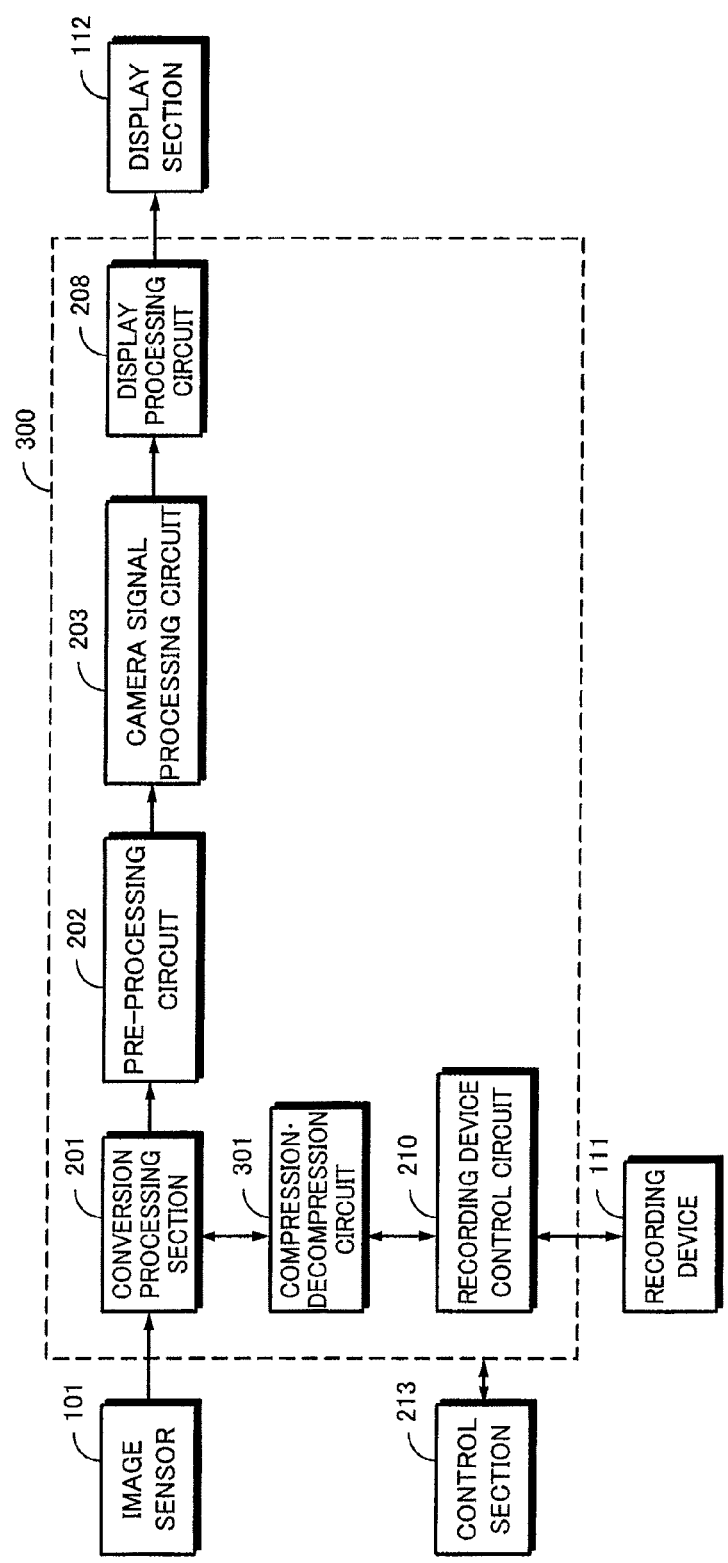
FIG. 7 is a block diagram showing an image capturing apparatus according to a second embodiment of the present invention.

Next, with reference to FIG. 7, an image capturing apparatus 300 according to a second embodiment of the present invention will be described. In the image capturing apparatus 300, a compression and decompression circuit 301 is disposed between a conversion processing section 201 and a recording device control circuit 210. The compression and decompression circuit 301 performs a compression-encoding process according to an encoding system, for example, JPEG (Joint Photographic Experts Group) or the like for raw data of the high screen rate received from the conversion processing section 201. Compression-encoded data are written to a recording device 111 under the control of the recording device control circuit 210. As the compression-decompression encoding system, a binary data encoding system may be used instead of the JPEG.

Figure 8:
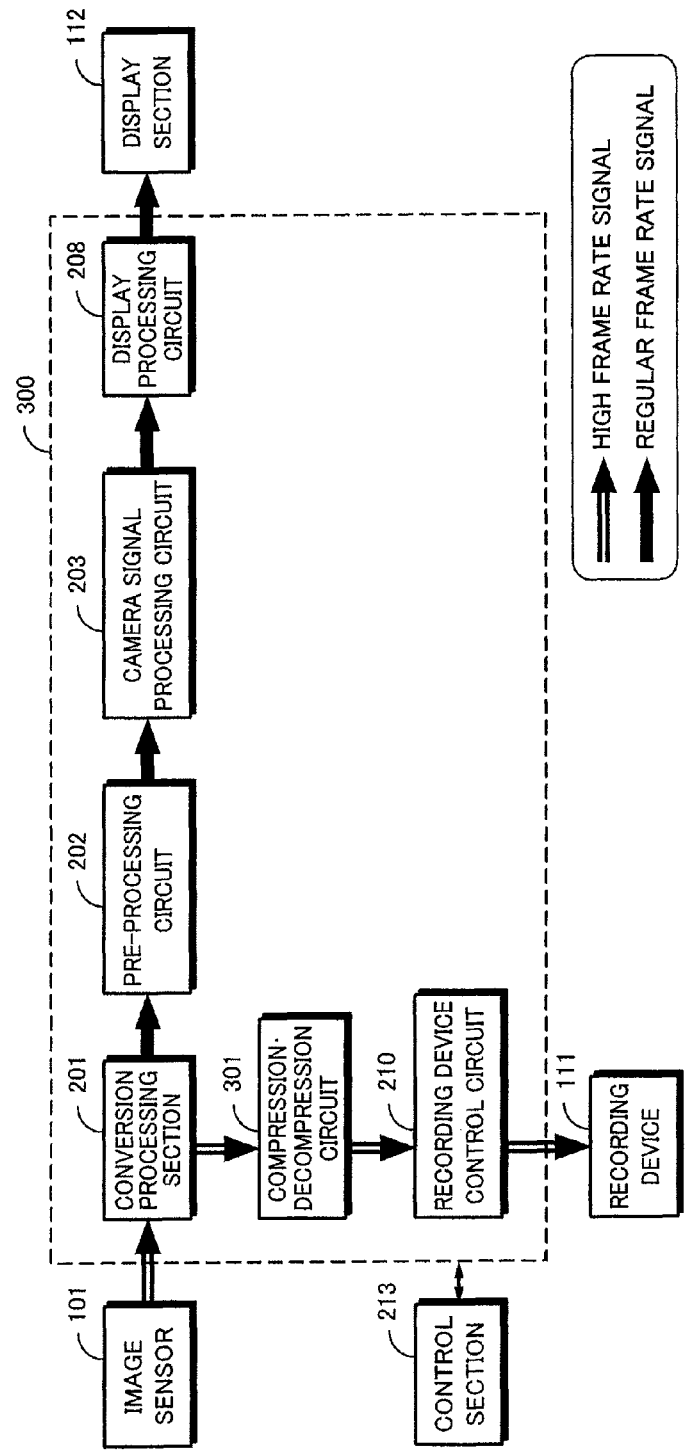
FIG. 8 is a data flow chart in a high speed image capturing mode of the second embodiment of the present invention.

FIG. 8 shows signal flows in the recording state. Raw data of the high screen rate obtained in the high speed image capturing mode are compression-encoded by the compression and decompression circuit 301 and the compression-encoded data are recorded on a recording device 111 through the recording device control circuit 210. Like the first embodiment, an image signal whose screen rate has been converted into the regular screen rate by the conversion processing section 201 and that has been processed by the pre-processing circuit 202 and the camera signal processing circuit 203 is displayed on the display section 112.

Figure 9:
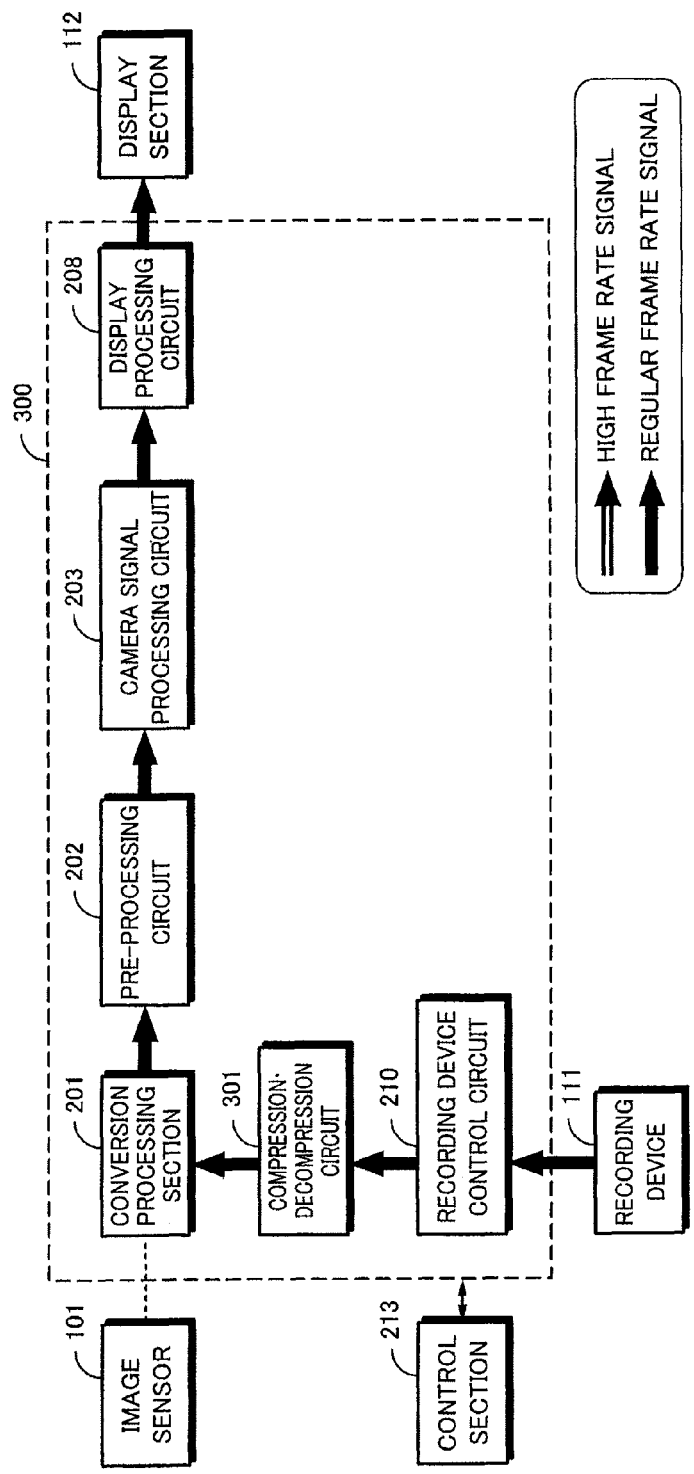
FIG. 9 is a data flow chart in an image reproducing state of the second embodiment of the present invention.

As shown in FIG. 9, in the reproducing state, encoded data of raw data that have been read from the recording device 111 and supplied from the recording device control circuit 210 is expansion-decoded by the compression and decompression circuit 301. Expansion-decoded raw data are supplied from the conversion processing section 201 to the display section 112 through the pre-processing circuit 202, the camera signal processing circuit 203, and the display processing circuit 208 and a reproduced image is displayed on the display section 112. The read speed of the recording device 111 is set up such that raw data of the regular screen rate are read.

Figure 10:
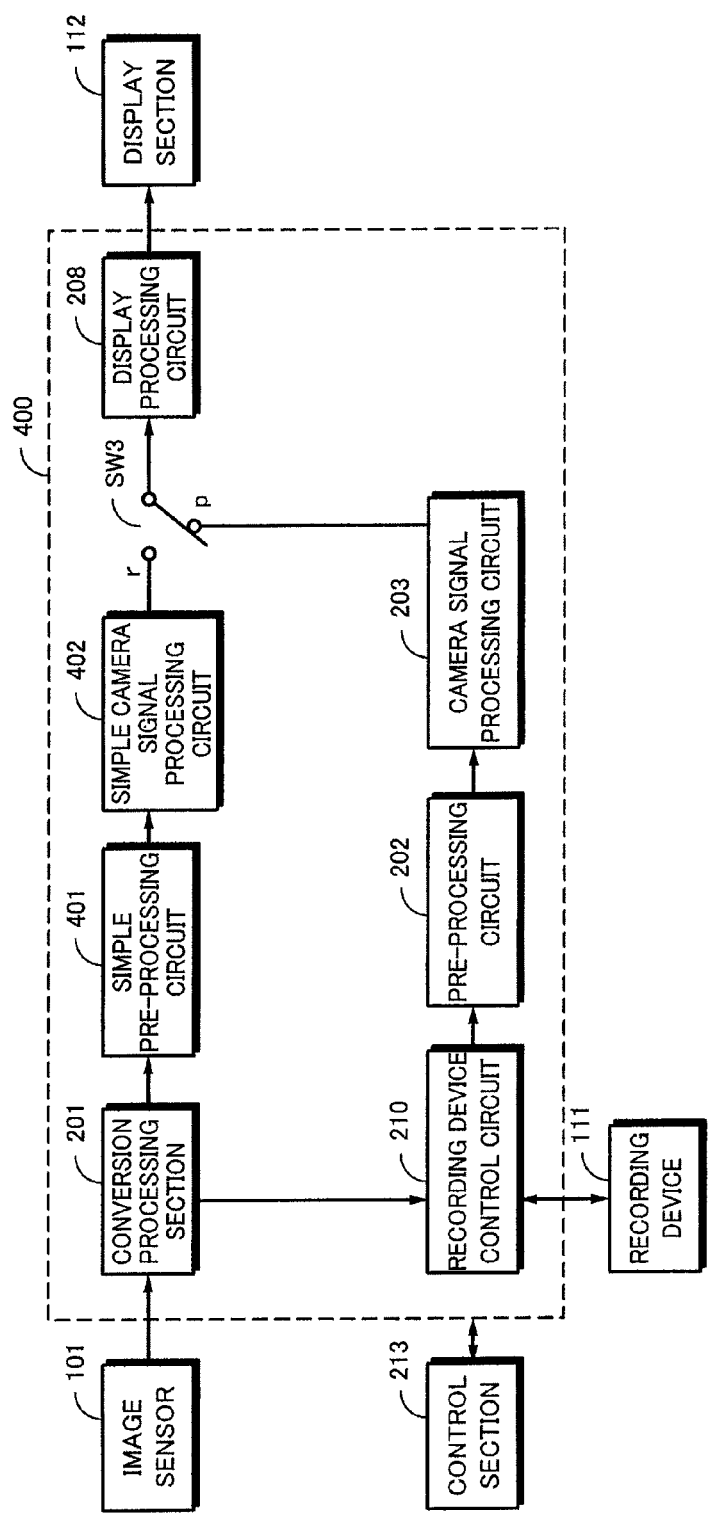
FIG. 10 is a block diagram showing an image capturing apparatus according to a third embodiment of the present invention.

Next, with reference to FIG. 10, an image capturing apparatus 400 according to a third embodiment of the present invention will be described. In the image capturing apparatus 400, a simple pre-processing circuit 401 and a simple camera signal processing circuit 402 are disposed downstream of a signal of a conversion processing section 201 so as to display a camera-through image that is being captured on the display section 112. "Simple" means that these circuits generate an image that is displayed only on the display section 112 and the image quality of an image to be displayed may be as low as that satisfying the purpose of checking for an image of an object being captured. For example, the number of bits of a signal displayed on the display section 112 is needed to be smaller than that of output data of an A/D converter of the pre-processing circuit 401. The simple pre-processing circuit 401 may be omitted. With the simple structure, power consumption and heat generation for which an image is monitored in the high speed image capturing state can be reduced.

Figure 11:
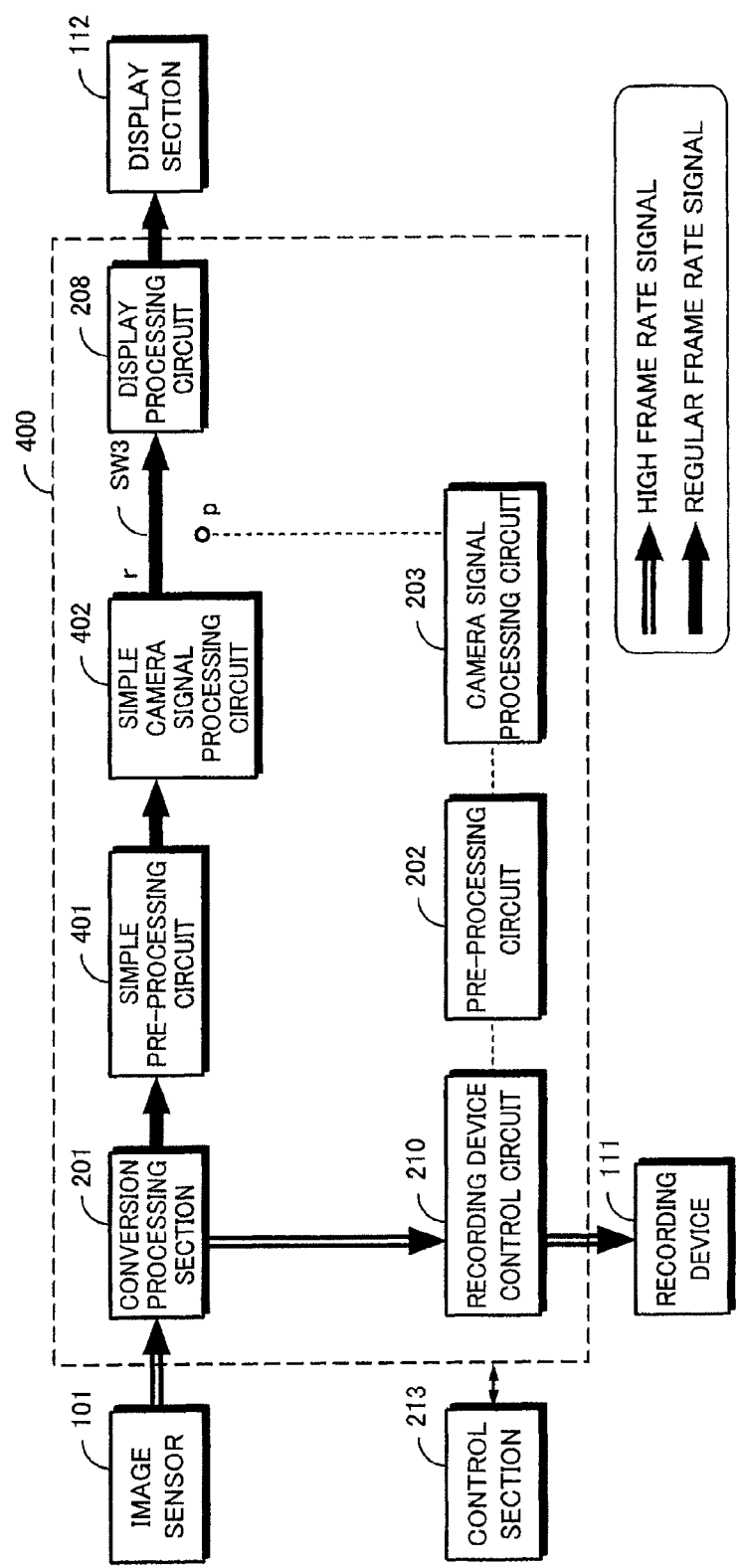
FIG. 11 is a data flow chart in a high speed image capturing mode according to a third embodiment of the present invention.

FIG. 11 shows signal flows in the recording state of the image capturing apparatus 400. In the high speed image capturing mode, raw data having a screen rate of 240 fps received from the image sensor 101 are converted into raw data having the regular screen rate of 60 fps by the conversion processing section 201. Raw data having the regular screen rate are supplied to the display processing circuit 208 through the simple pre-processing circuit 401, the simple camera signal processing circuit 402, and a terminal r of a switch SW3 and the raw data are displayed by the display section 112. In the high speed image capturing mode, when a record command is issued, raw data having the high screen rate are recorded on the recording device 111 through the recording device control circuit 210.

Figure 12:
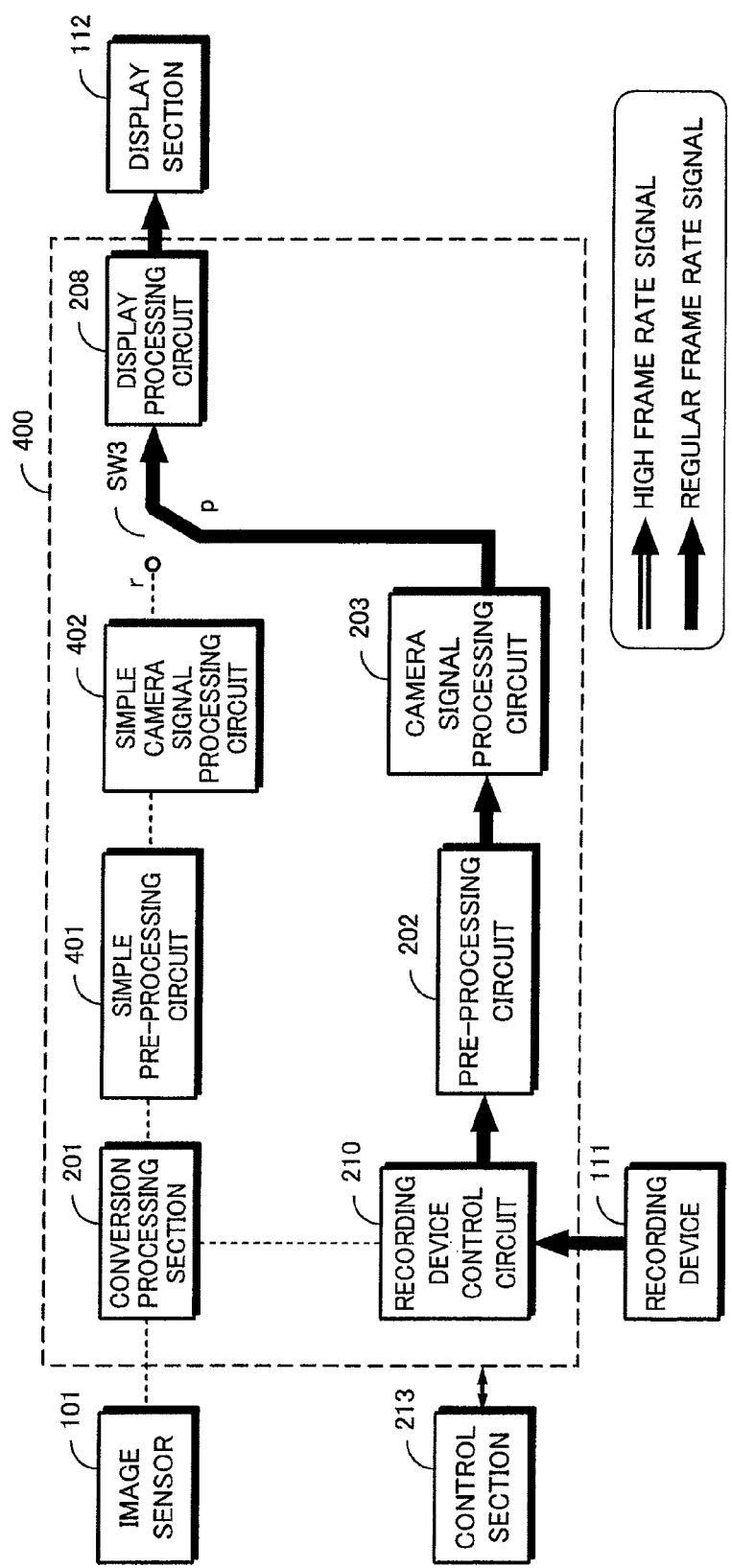
FIG. 12 is a data flow chart in an image reproducing state of the third embodiment of the present invention.

As shown in FIG. 12, in the reproducing state, raw data read from the recording device 111 are supplied from the recording device control circuit 210 to the pre-processing circuit 202, the raw data are processed by the camera signal processing circuit 203, and are sent to the display section 112 through a terminal p of the switch SW3 and the display processing circuit 208. The pre-processing circuit 202 and the camera signal processing circuit 203 have the same structure as those of the foregoing first and second embodiments and a reproduced image having a higher quality than an image being captured is displayed on the display section 112.

Figure 13:
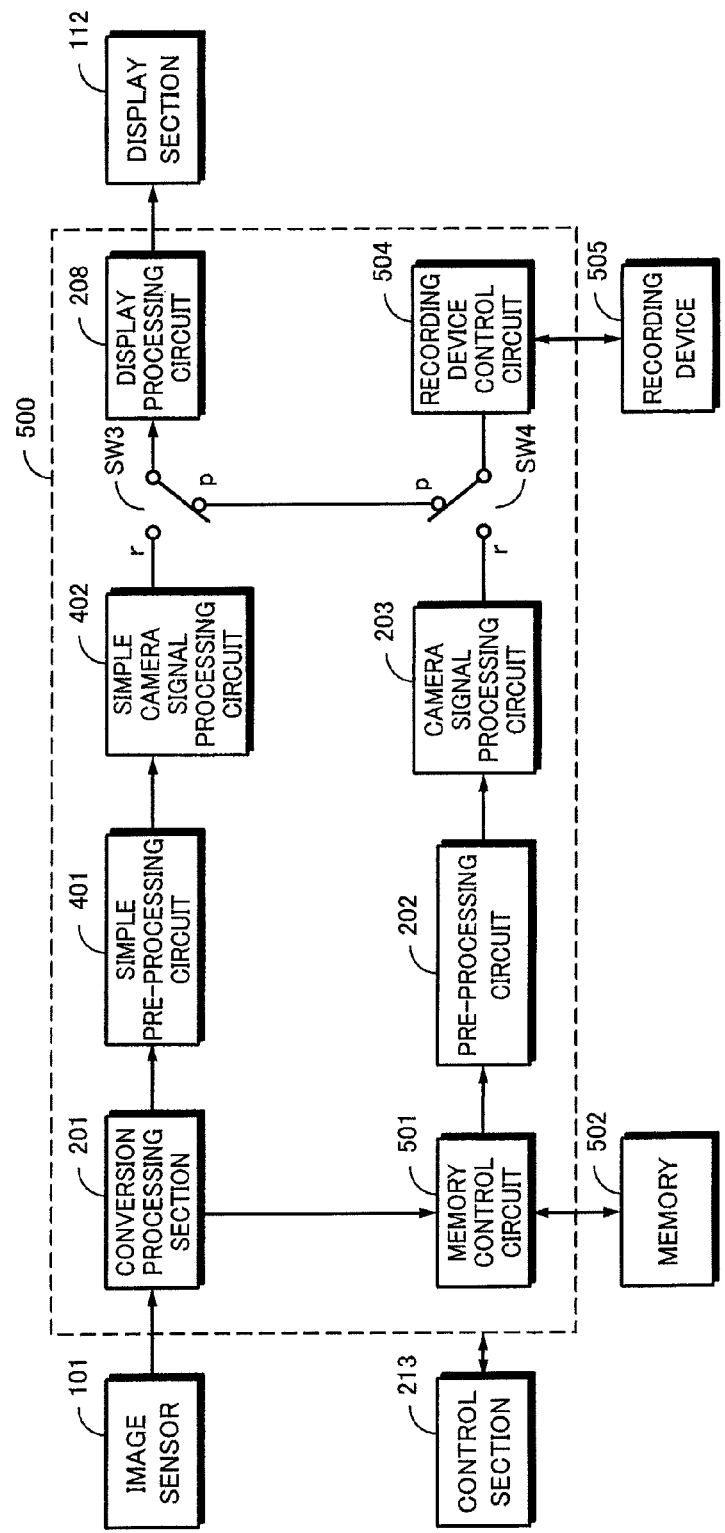
FIG. 13 is a block diagram showing an image capturing apparatus according to a fourth embodiment of the present invention.

Next, with reference to FIG. 13, an image capturing apparatus 500 according to a forth embodiment of the present invention will be described. The image capturing apparatus 500 has a simple pre-processing circuit 401 and a simple camera signal processing circuit 402 disposed downstream of a signal of a conversion processing section 201 so as to display a camera-through image being captured on the display section 112. Thus, like the foregoing third embodiment, power consumption and heat generation that occur while an image is being monitored can be reduced. In addition, in a non-recording period, raw data can be read from a memory 502 at the regular screen rate and a camera signal process can be performed for the raw data such that the resultant data are recorded on a recording device 505.

In the image capturing apparatus 500, raw data received from the conversion processing section 201 are supplied to the memory 502 through a memory control circuit 501. The memory control circuit 501 controls writing and reading image data to and from the memory 502. The memory 502 is a FIFO (First In First Out) type memory that temporarily stores image data received from the memory control circuit 501, for example an SDRAM (Synchronous Dynamic Random Access Memory) or the like. The memory 502 performs buffering corresponding to throughputs of the pre-processing circuit 202 and the camera signal processing circuit 203.

An output signal of the camera signal processing circuit 203 is supplied to a terminal r of a switch SW4. A terminal p of the switch SW4 and a terminal p of a switch SW3 are connected in common. The switch SW4 is connected to a recording device control circuit 504. Connected to the recording device control circuit 504 is a recording device 505.

The recording device control circuit 504 controls writing and reading image data to and from the recording device 505 through the switch SW4. Data stored in the recording device 505 are a luminance signal and a color difference signal processed by the pre-processing circuit 202 and the camera signal processing circuit 203. The recording device 505 may be a magnetic tape, a semiconductor memory such as a flash memory, a recordable optical disc, a hard disk, or the like. The recording device 505 is basically an attachable/detachable type. Instead, the recording device 505 may not be attachable/detachable type and recorded data may be output to the outside through a communication interface.

Figure 14:
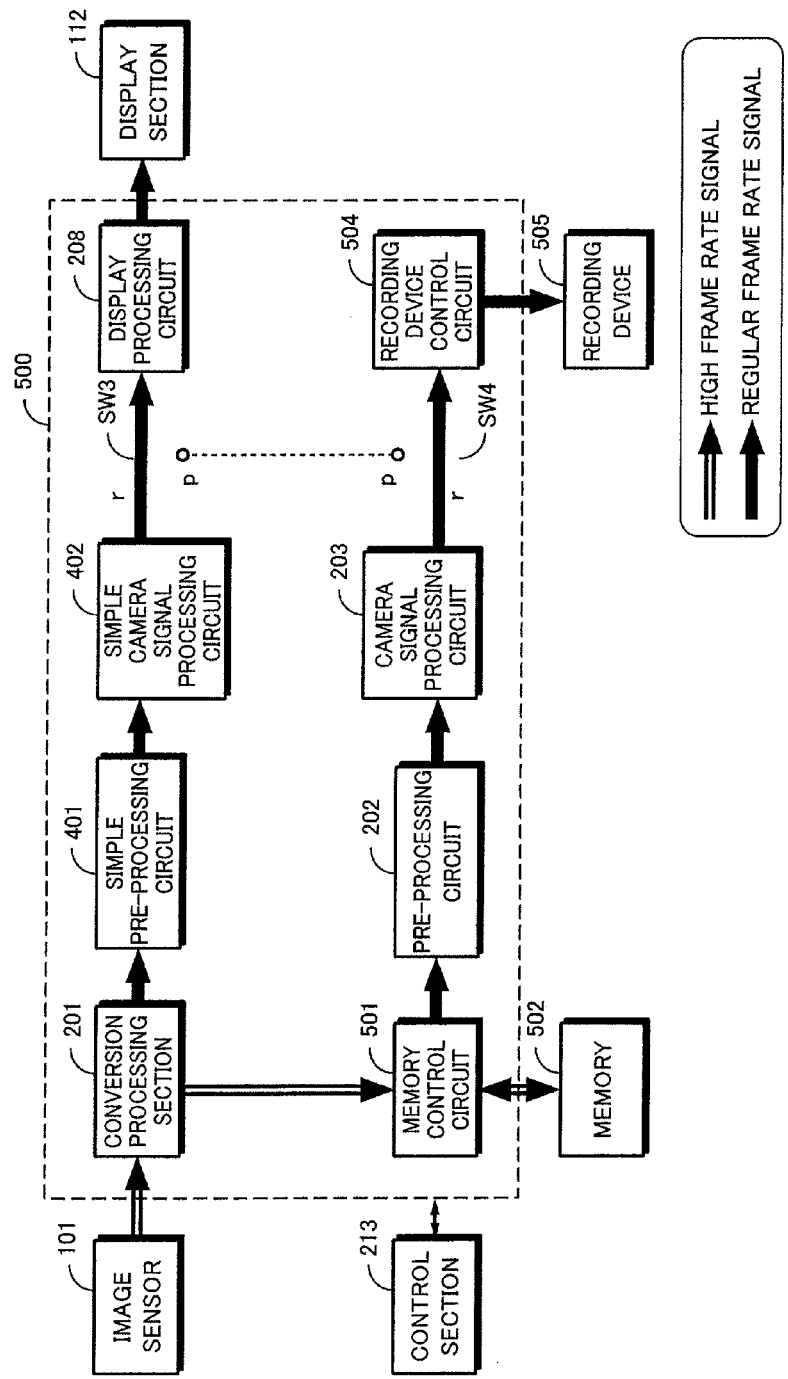
FIG. 14 is a data flow chart in a high speed image capturing mode of the fourth embodiment of the present invention.

FIG. 14 shows signal flows in the recording state of the image capturing apparatus 500. In the high speed image capturing mode, raw data having a screen rate of 240 fps received from the image sensor 101 is converted into raw data having the regular screen rate of 60 fps by the conversion processing section 201. The raw data having the regular screen rate is supplied to a display processing circuit 208 through the simple pre-processing circuit 401, the simple camera signal processing circuit 402, and the terminal r of the switch SW3 and the raw data are displayed by the display section 112. When a record command is issued in the high speed image capturing mode, the raw data having the high screen rate is recorded on the memory 502 through the memory control circuit 501.

In a recording pause period in the high speed image capturing mode, for example, in a recoding standby state where a hand is released from a record button, raw data are read from the memory 502 and the raw data are processed by the pre-processing circuit 202 and the camera signal processing circuit 203 and an output signal of the camera signal processing circuit 203 is recorded on the recording device 505 through the terminal r of the switch SW4 and the recording device control circuit 504. The raw data are read from the memory 502 at the regular screen rate of 60 fps or a lower rate.

Figure 15:
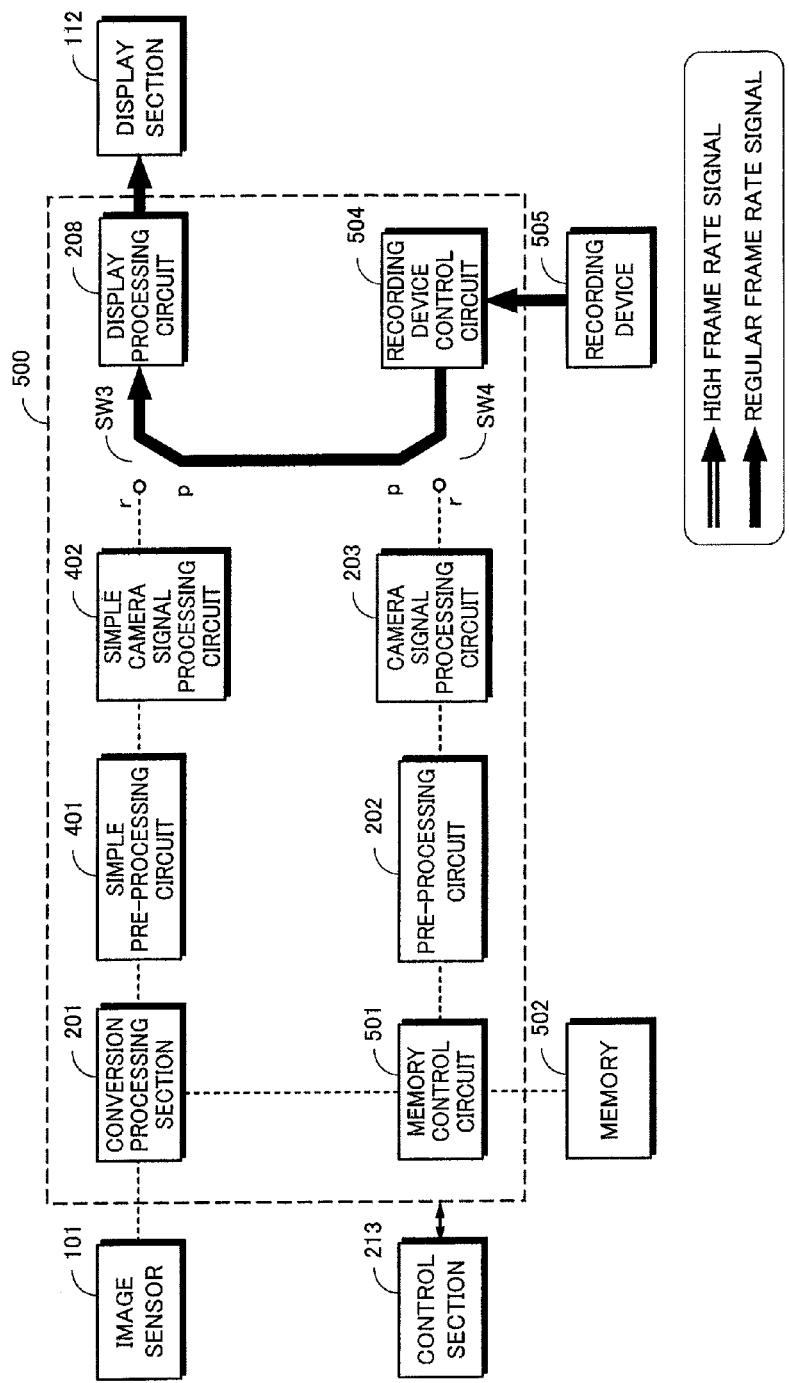
FIG. 15 is a data flow chart in an image reproducing state of the fourth embodiment of the present invention.

As shown in FIG. 15, in the reproducing state, raw data having the regular screen rate read from the recording device 505 are sent to the display section 112 through the recording device control circuit 504, the terminal p of the switch SW4, and the display processing circuit 208. A reproduced image reproduced from the recording device 505 is displayed by the display section 112. In the image capturing apparatus 500, when the raw data are reproduced, the camera signal process is not required in comparison with that of the foregoing embodiment and thereby when the raw data are reproduced, the power consumption can be reduced.

The present invention is not limited to the foregoing embodiments. Instead, various modifications of the embodiments can be performed based on the spirit of the present invention. For example, data stored in the recording device 111 of the image capturing apparatus 400 (FIG. 10) of the third embodiment or data stored in the memory 502 or the recording device 505 of the image capturing apparatus 500 (FIG. 13) of the fourth embodiment may be compressed.

In addition, the present invention can be applied to devices having an image capturing function such as a mobile phone and a PDA (Personal Digital Assistants) as well as a camcorder and a digital still camera. In addition, the present invention can be applied to a processing device and a recording device for a captured image signal of a small camera for a television phone or a game software application connected to a personal computer or the like.

DESCRIPTION OF REFERENCE NUMERALS 100, 200, 300, 400, 500 . . . IMAGE CAPTURING APPARATUS
101 . . . IMAGE SENSOR
102, 202 . . . PRE-PROCESSING CIRCUIT
103, 203 . . . CAMERA SIGNAL PROCESSING CIRCUIT
104, 201 . . . CONVERSION PROCESSING SECTION
105, 109, 301 . . . COMPRESSION AND DECOMPRESSION CIRCUIT
106, 501 . . . MEMORY CONTROL CIRCUIT
107, 502 . . . MEMORY
108, 208 . . . DISPLAY PROCESSING CIRCUIT
111, 505 . . . RECORDING DEVICE
112 . . . DISPLAY SECTION
113, 213 . . . CONTROL SECTION
401 . . . SIMPLE PRE-PROCESSING CIRCUIT
402 . . . SIMPLE CAMERA SIGNAL PROCESSING CIRCUIT

The invention claimed is:

1. An imaging apparatus, comprising:
an image sensor configured to output first RAW data having a first frame rate;
a signal processor configured to perform a signal processing including a simultaneously forming processing and a white balance processing; and
circuitry configured to
in a recording process of the first RAW data onto a recording medium,
(a) convert the first RAW data output from the image sensor into second RAW data having a second frame rate which is lower than the first frame rate,
(b) control the signal processor to perform the signal processing on the second RAW data to output a camera-through image being captured for display at the second frame rate, and
(c) record the first RAW data output from the image sensor onto the recording medium without converting the first RAW data into the second RAW data and without performing the simultaneously forming processing and the white balance processing by the signal processor,
in a reproducing process of the first RAW data recorded on the recording medium,
(a) read the first RAW data from the recording medium without converting the first RAW data into the second RAW data, and
(b) control the signal processor to perform the signal processing on the first RAW data read from the recording medium to output a slow motion reproduced image for display at the second frame rate.

2. The imaging apparatus according to claim 1, wherein the first frame rate is for a high speed image capture mode of the image sensor and the second frame rate is for display on a display device.

3. The imaging apparatus according to claim 2, wherein the first frame rate is at least four times as high as the second frame rate.

4. The imaging apparatus according to claim 1, wherein the circuitry is further configured to decimate, in the recording process, the number of fields per unit time of the first RAW data to convert the first RAW data output from the image sensor into the second RAW data.

5. The imaging apparatus according to claim 1, wherein the recording medium is attachable, wherein the recording medium comprises a semiconductor memory.

6. The imaging apparatus according to claim 1, wherein the signal processing comprises a YC generation processing.

7. The imaging apparatus according to claim 1, wherein the circuitry is further configured to control the signal processor to perform the signal processing on the second RAW data at the second frame rate in the recording process and control the signal processor to perform the signal processing on decompressed first RAW data at the second frame rate in the reproducing process.

8. The imaging apparatus according to claim 1, further comprising:
compression and decompression circuitry configured to compress and decompress the first RAW data,
wherein the compression and decompression circuitry compresses the first RAW data in advance of recording to the record medium in the recording process; and
the compression and decompression circuitry decompress the first RAW data compressed by the compression and decompression circuitry and read from the recording medium in the reproducing process.

9. The imaging apparatus according to claim 8, wherein the compression and decompression circuitry is further configured to compress and decompress the first RAW data according to a still image encoding system.

10. The imaging apparatus according to claim 9, wherein the still image encoding system is JPEG format.

11. An image capturing method, comprising the steps of:
controlling an image sensor to output first RAW data having a first frame rate;
performing signal processing including a simultaneously forming processing and a white balance processing by a signal processor; and
in a recording process of the first RAW data onto a recording medium,
(a) converting the first RAW data output from the image sensor into second RAW data having a second frame rate which is lower than the first frame rate, (b) controlling, by circuitry, the signal processor to perform the signal processing on the second RAW data to output a camera-through image being captured for display at the second frame rate, and (c) recording the first RAW data output from the image sensor onto the recording medium without converting the first RAW data into the second RAW data and without performing the simultaneously forming processing and the white balance processing by the signal processor, in a reproducing process of the first RAW data recorded on the recording medium, (a) reading the first RAW data from the recording medium without converting the first RAW data into the second RAW data, and (b) controlling the signal processor to perform the signal processing on the first RAW data read from the recording medium to output a slow motion reproduced image for display at the second frame rate.

12. An imaging apparatus, comprising:

an image sensor configured to output first RAW data having a first frame rate;

a signal processor configured to perform a signal processing including a simultaneously forming processing and a white balance processing; and circuitry configured to during a recording process, (a) convert the first RAW data output from the image sensor into second RAW data having a second frame rate which is lower than the first frame rate, (b) control the signal processor to perform the signal processing on the second RAW data to output a camera-through image being captured for display at the second frame rate, (c) compress the first RAW data output from the image sensor to output compressed first RAW data, and (d) record the compressed first RAW data, without converting the compressed first RAW data into the second RAW data and without performing the simultaneously forming processing and the white balance processing by the signal processor, onto a recording medium which is attachable to the imaging apparatus, wherein the recording medium comprises a semiconductor memory, during a reproducing process, (a) read the compressed first RAW data from the recording medium, (b) decompress the compressed first RAW data read from the recording medium to output decompressed first RAW data without converting the decompressed first RAW data into the second RAW data, and (c) control the signal processor to perform the signal processing on the decompressed first RAW data to output a slow motion reproduced image for display at the second frame rate.

13. The imaging apparatus according to claim 12, wherein the first frame rate is for a high speed image capture mode of the image sensor and the second frame rate is for display on a display device.

14. The imaging apparatus according to claim 13, wherein the first frame rate is at least four times as high as the second frame rate.

15. The imaging apparatus according to claim 14, wherein the first frame rate is 240 frames per second and the second frame rate is 60 frames per second.

16. The imaging apparatus according to claim 13, further comprising the display device having a LCD.

17. The imaging apparatus according to claim 13, further comprising an external output interface to output the camera-through image and the slow motion reproduced image to the display device.

18. The imaging apparatus according to claim 12, wherein the image sensor comprises CMOS type image capturing device.

19. The imaging apparatus according to claim 18, wherein the CMOS type image capturing device comprises an array of color filters including a R filter, a B filter and a G filter.

20. The imaging apparatus according to claim 12, wherein the circuitry is further configured to decimate, during the recording process, the number of fields per unit time of the first RAW data to convert the first RAW data output from the image sensor into the second RAW data.

21. The imaging apparatus according to claim 12, further comprising a size adjustment circuitry configured to adjust a size of the second RAW data during the recording process, for display on a display device and adjust a size of the decompressed first RAW data during the reproducing process for display on the display device.

22. The imaging apparatus according to claim 12, wherein the recording medium is attachable such that the compressed first RAW data is retrieved to an external computer, the external computer performs a simultaneously forming processing and a white balance processing on the compressed first RAW data.

23. The imaging apparatus according to claim 12, wherein the signal processing comprises a shading correction processing.

24. The imaging apparatus according to claim 12, wherein the signal processing comprises a aperture correction processing.

25. The imaging apparatus according to claim 12, wherein the signal processing comprises a gamma correction processing.

26. The imaging apparatus according to claim 12, wherein the signal processing comprises a YC generation processing.

27. The imaging apparatus according to claim 12, wherein the circuitry is further configured to control the signal processor to perform the signal processing on the second RAW data at the second frame rate during the recording process and control the signal processor to perform the signal processing on the decompressed first RAW data at the second frame rate during the reproducing process.

28. The imaging apparatus according to claim 12, wherein the circuitry is further configured to compress the first RAW data output from the image sensor according to a still image encoding system.

29. The imaging apparatus according to claim 28, wherein the still image encoding system is MEG format.

30. An image capturing method for an imaging apparatus, comprising the steps of:

controlling an image sensor to output first RAW data having a first frame rate;

performing signal processing including a simultaneously forming processing, a white balance processing and a YC generation processing by a signal processor; and during a recording process, (a) converting the first RAW data output from the image sensor into second RAW data having a second frame rate which is lower than the first frame rate, (b) controlling, by circuitry, the signal processor to perform the signal processing on the second RAW data to output a camera-through image being captured for display at the second frame rate, (c) compressing the first RAW data output from the image sensor to output a compressed first RAW data, and
(d) recording the compressed first RAW data onto the recording medium without converting the first RAW data into the second RAW data and without performing the simultaneously forming processing, the white balance processing and the YC generation processing by the signal processor, during a reproducing process, (a) reading the compressed first RAW data from the recording medium,
(b) decompressing the compressed first RAW data read from the recording medium to output a decompressed first RAW data without converting the decompressed first RAW data into the second RAW data, and
(c) controlling, by circuitry, the signal processor to perform the signal processing on the decompressed first RAW data to output a slow motion reproduced image for display at the second frame rate.

* * * * *